United States Patent
Wang

(10) Patent No.: US 6,297,312 B1
(45) Date of Patent: Oct. 2, 2001

(54) ONE-PACK WATERBORNE ADHESION COATINGS FOR THERMOPLASTIC OLEFINS

(75) Inventor: I-Hsiung Wang, Dallas, TX (US)

(73) Assignee: Apollo Coating Technologies, Inc., Dallas, TX (US)

( * ) Notice: Subject to any disclaimer, the term of this patent is extended or adjusted under 35 U.S.C. 154(b) by 0 days.

(21) Appl. No.: 09/535,908

(22) Filed: Mar. 24, 2000

(51) Int. Cl.$^7$ .................................................. C08L 75/00
(52) U.S. Cl. ............................................................ 524/507
(58) Field of Search ............................................. 524/507

(56) References Cited

U.S. PATENT DOCUMENTS

| | | | |
|---|---|---|---|
| 4,546,046 | 10/1985 | Etzell et al. | 428/460 |
| 4,720,528 | 1/1988 | Etzell et al. | 525/450 |
| 4,849,297 | 7/1989 | Mansell et al. | 428/457 |
| 4,855,359 | 8/1989 | Ryntz et al. | 525/130 |
| 4,954,573 | 9/1990 | Fry et al. | 535/327.6 |
| 4,981,730 | 1/1991 | Zaleski | 427/393.5 |
| 5,102,946 | 4/1992 | Chen et al. | 524/527 |
| 5,169,888 | 12/1992 | Sales | 524/267 |
| 5,198,485 | 3/1993 | King et al. | 524/243 |
| 5,258,444 * | 11/1993 | Zezinka | 524/507 |
| 5,288,780 | 2/1994 | Jarzombek et al. | 524/127 |
| 5,300,363 | 4/1994 | Laura et al. | 428/413 |
| 5,319,032 | 6/1994 | Martz et al. | 525/301 |
| 5,397,602 | 3/1995 | Martz et al. | 427/343.5 |
| 5,425,926 | 6/1995 | Kunikiyo et al. | 427/393.5 |
| 5,427,856 | 6/1995 | Laura et al. | 428/413 |
| 5,618,599 | 4/1997 | Nulman et al. | 428/36.7 |
| 5,693,423 | 12/1997 | Laura et al. | 428/413 |
| 5,709,946 | 1/1998 | Jackson et al. | 428/413 |
| 5,777,022 | 7/1998 | Bugajski et al. | 524/527 |
| 5,959,015 | 9/1999 | Helms et al. | 524/394 |

OTHER PUBLICATIONS

Plastics—Future Trends in Coatings for Automotive Plastics, by Rose A. Ryntz, Ph.D., pp. 138, 140 (www.pcimag.com) Jan. 2000.

* cited by examiner

*Primary Examiner*—Paul R. Michl
(74) *Attorney, Agent, or Firm*—Dennis T. Griggs; Scott T. Griggs

(57) ABSTRACT

A one-pack, low VOC, waterborne adhesion coating composition and method of making and using the same. The composition includes a coalescing agent, a halogenated resin, a modified anionic polyurethane dispersion blend, and a wetting and dispersing agent. It is suitable for coating a variety of substrates including polyolefinic substrates, in particular thermoplastic olefin resins, polypropylene, and operates without the addition of an adhesion promoter step at a low curing temperature.

15 Claims, No Drawings

ONE-PACK WATERBORNE ADHESION COATINGS FOR THERMOPLASTIC OLEFINS

BACKGROUND OF THE INVENTION

This invention relates generally to adhesive coatings, and more specifically to aqueous or waterborne adhesion coatings, and methods of making and using the same.

The demand for olefinic resins, e.g. polyethylene (PE) and polypropylene (PP), in the automotive industry is increasing. In 1998, the automotive industry used 274 million pounds of olefinic resins to coat plastic substrates. By 2005, the automotive industry is projected to use an estimated 750 million pounds of olefinic resins per year.

Thermoplastic olefins (TPOs), mixtures of polypropylene (PP), ethylene-propylene-diene (EPDM), rubber and talc, are fast replacing steel components such as grills, lamp hole covers, automotive bumpers and side body panels. TPO components are less expensive, softer, less dense, easier to mold, easier to recycle and resist corrosion better than their steel counterparts.

TPO poses a significant problem. TPO does not easily adhere to standard one-component (1K) or two-component (2K) coatings. The polypropylene present in TPO creates a low free energy, non-polar surface which hinders bonding.

In an effort to solve this problem, polyolefinic and other plastic substrates have been coated with coating systems containing organic solvents. This solution is undesirable for two reasons: 1) organic solvents are toxic to the environment (high volatile organic compounds) and 2) organic solvents are expensive for waste treatment.

Using an adhesion promoter, namely chlorinated polyolefin (CPO), to bond with the non-polar surface has been proposed, for example in U.S. Pat. No. 4,954,573 (incorporated by reference). Several processes have been proposed to eliminate or minimize the application of CPO adhesion promoters to reduce volatile organic compounds (VOCs) associated with the process and the overall production costs.

U.S. Pat. No. 5,693,423, incorporated by reference, discloses a waterborne coating containing TPO which uses a CPO resin, an ethylene glycol, a surfactant, and an aliphatic amine.

U.S. Pat. No. 4,981,730, incorporated by reference, discloses a low VOC (about 3.5 pounds/gallon) aqueous composition which is suitable as a primer coating on a non-porous substrate such as plastic.

The following United States patents, which are incorporated by reference herein, relate more generally to coating compositions for plastic substrates, including polyolefin substrates: U.S. Pat. Nos. 5,198,485; 5,258,444; 5,288,780; 5,300,363; 5,425,926; 5,427,856; 5,709,946; and 5,777,022.

SUMMARY OF THE INVENTION

There is a continuing interest in providing an improved single coat, aqueous based plastic coating with a reduced level of VOCs. The compositions and methods of the present invention preferably employ a) a resin, b) a modified anionic polyurethane dispersion blend, c) coalescing agents, d) an anionic surfactant, e) wetting and dispersing additives, and f) a surface tension reducer. In another embodiment the compositions and method further employ a preservative, pigment and fillers.

The advantages of the invention are: (a) an easy to use single coat application, (b) minimal required cleaning of the plastic substrates, (c) eliminates a separate CPO step and subsequent coating steps (basecoat and topcoat), (d) reduced levels of VOCs, (e) reduced curing temperature, (f) increased durability and stability, (g) low odor, and (h) easy to handle and clean.

Numerous other advantages and features of the present invention will become readily apparent from the following detailed description of the preferred embodiments and the appended claims.

DETAILED DESCRIPTION OF THE INVENTION

Preferred embodiments of the invention will now be described with reference to various examples of how the invention can best be made and used.

The present invention provides one-pack aqueous or waterborne adhesion compositions useful in coating polyolefinic-containing substrates. In particular, the compositions are ideal for hard to adhere plastics such as TPO and PP. The one-pack waterborne primer compositions or systems, characterized by a VOC content of about 0.4 to about 2.0 lbs/gal, comprise:

(a) a halogenated polyolefinic resin;
(b) a modified anionic polyurethane dispersion blend;
(c) coalescing agents;
(d) an anionic surfactant;
(e) wetting and dispersing additives; and,
(f) surface tension reducers.

Preferably, the compositions and method of the present invention further employ a preservative, pigments and fillers.

The present compositions can form strong and flexible bonds between the coating and the plastic substrate without the aid of an adhesion promoter step.

The adhesion coatings provided by the compositions and methods of the present invention may be decorative, protective, or both. The coatings provided are capable of bonding with other materials such as a basecoat or a clearcoat layer, for example an acrylic, styrene butadiene rubber, polyurethane, epoxy, nitrile butadiene rubber, polyvinyl butyral or mixtures thereof. The coatings may be applied or deposited by any conventional method, such as airless, air-assisted airless gun or HVLP (high volume, low pressure) gun and spray-painting robot, thereby producing a multilayered article.

The present composition of one-pack waterborne primers or surfacers with direct adhesion to TPO achieves strong solvent-borne performance without the excessive use of aromatic solvents such as benzene, xylene and toluene.

The VOC content of the present invention is more environmentally friendly than previous solvent-borne coatings with higher VOC contents. VOC content is defined as the ratio of solvent to non-volatile solids. The water present in the aqueous composition does not enter into the calculation. The present composition has an ultra low VOC content of about 0.4 to about 2.0 pounds/gallon as compared to the EPA's VOC content standard of 4.8 pounds/gallon.

The coating compositions and systems of the present invention include a resin or an adhesion promoter. The class of preferred resin is a halogenated polyolefin, more preferably a CPO. In the coating compositions of the present invention a chlorinated polyolefin such as those commercially available by the trade names CP310W, CP347W or CP349W were found to be particularly useful.

CP310W, CP347W and CP349W can be obtained from Eastman Chemical Company (Kingsport, Tenn., U.S.A.).

The selection of the resin depends on many factors such as the surface to be coated, processing conditions, cost, the other components to be selected (the coalescing agent, anionic surfactant, etc.) and the environment. The final coating compositions of the present invention preferably employ the selected resin in the amount of about 5 to about 40 weight percent.

The coating compositions of the present invention further include a modified anionic polyurethane dispersion blend. Preferably, the modified anionic polyurethane dispersion blends include combinations of the newly developed CK Witco UCX99 (research code) and UCX00 (research code) series polyurethane blends with or without Witcobond™ W-240 (research code). In the coating compositions of the present invention, the modified anionic polyurethane dispersion blends are preferably the CK Witco UCX99 and UCX00 series identified by the research codes UCX99-027, UCX99-082, UCX99-079, UCX99-083 and UCX00-002, which were found to be particularly useful.

CK Witco UCX99-027, UCX99-79, UCX99-082, UCX99-083, UCX00-002 and Witcobond™ W-240 blends can be obtained from CK Witco Corporation (Tarrytown, N.Y., U.S.A.).

The amount of modified anionic polyurethane dispersion blends in the present composition depends upon the VOC, dry film thickness, gloss and adhesion properties of the plastic coating. The final coating compositions of the present invention preferably employ the selected modified anionic polyurethane dispersion blends in the amount of about 30% to about 50% based on the total weight of the formulation.

The coating compositions of the present invention further include coalescing agents and surface tension reducer. In the coating combinations of the present invention the coalescing agents and surface tension reducer N-methyl-2-pyrrolidone and (NMP), N-octyl-2-pyrrolidone (Surfadone™ LP100), dipropylene glycol methyl ether (ARCOSOLV™ DPM or DPM), dipropylene glycol n-butyl ether (ARCOSOLV™ DPNB or DPNB), propylene glycol n-butyl ether (ARCOSOLV™ PNB or PNB), and N-methyl-2-pyrrolidone (N-Pyrol™) were found to be particularly useful.

NMP, N-Pyrol™ and Surfadone™ LP 100 can be obtained from Lyondell Chemical Corporation (Newtown Square, Pa., U.S.A.) and International Specialty Products (Wayne, N.J., U.S.A.), respectively. ARCOSOLV™ DPM, ARCOSOLV™ PNB, and ARCOSOLV™ DPNB can be obtained from Lyondell Chemical Corporation (Newtown Square, Pa., U.S.A.).

The particular selection(s) of the coalescents depends upon the resin. The final coating composition of the present invention preferably employs the selected coalescing agent in the amount of about 2 to about 10 percent based on the weight of the polymer solids.

The coating compositions and systems of the present invention further include an anionic surfactant or surface-active agent. Exemplary anionic surface-active agents include materials such as those containing a carboxylate group attached directly to a hydrophobic group, or where there is an intermediate functional group such as an ester, amide, or sulfonamide present. Preferably the anionic surfactant is a polyether modified dimethyl-polysiloxane. In the coating combinations of the present invention the anionic surfactants commercially available by the trade names BYK™ 345, BYK™ 346 and BYK™ 348 were found to be particularly useful. The particular combination of BYK™ 348 and the substrate wetting agent Surfyonal™ 104DPM, present in the amount of about 0.3 to about 2.0 weight percent, was found to be useful.

The anionic surfactants BYK™ 345, BYK™ 346 and BYK™ 348 can be obtained from BYK-Chemie USA (Wallingford, Conn., U.S.A.). Surfynol™ 104DPM can be obtained from Air Products and Chemicals, Inc. (Allentown, Pa., U.S.A.).

The coating compositions and systems of the present invention further include wetting and dispersing additives. The wetting and dispersing additives based on 2,4,7,9-tetramethyl-5-decyne-4,7-diol chemistry were found useful (0.1–0.5 weight %). Wetting and dispersing additives based on 2,4,7,9-tetramethyl-5-decyne-4,7-diol chemistry such as Surfynol CT-121, Surfynol CT-131 and Surfynol CT-151 were obtained from Air Products and Chemicals, Inc. (Allentown, Pa., U.S.A.). Hyper dispersants such as Solsperse 27000, Solsperse 36600 and Solsperse 40000 were obtained from Avencia (Charlotte, N.C., U.S.A.).

The coating compositions and systems of the present invention optionally include a preservative. In the coating combinations of the present invention the preservatives bicyclic oxazolidines, bicyclic oxanolinine (Nuosept™ 95) 1,2-benizothiazolin-3-one and 1,2-Benizothiazolin-3-one (Nuosept™ 495) were found to be particularly useful in the range 0.1–0.5 weight percent. Nuosept™ 95 and Nuosept™ 495 were obtained from Creanova, Inc. (Somerset, N.J., U.S.A.).

The coating compositions and systems of the present invention further include various high performance fillers. In the coating compositions of the present invention the inorganic fillers hydrous magnesium silicate talc pigments, (NYTAL™ 7700 and VANTALAC™ 6H) and Wollastonite (Wollastocoat™ 10ES) were found to be useful in an amount of about 1 to about 10 weight percent.

NYTAL™ 7700 and VANTALC™ 6H can be obtained from R. T. Vanderbilt Company, Inc. (Norwalk, Conn., U.S.A.). Wollastocoat™ 10ES can be obtained from NYCO™ Minerals, Inc. (Willsboro, N.Y., U.S.A.).

In the coating of the present invention fumed silicas such as Cab-O-Sil™ M-5, Cab-O-Sil™ TS-610 (treated with dimethyldichlorosilane), and AEROSIL™ R972 were found to be useful when used in combination with the inorganic fillers.

Cab-O-Sil™ M-5, Cab-O-Sil™ TS-610 (treated with dimethyldichlorosilane), and AEROSIL™ R972 were obtained from Cabot Corporation (Tuscola, Ill., U.S.A.) and Degussa Corporation (Ridgefield, N.J., U.S.A.), respectively (0.1–0.5 by weight %).

The coating compositions and systems of the present invention optionally include a pigment, preferably a carbon black pigment. In the coating combinations of the present invention pigments available by the trade names Raven 1020, Raven 1035, Elftex® 8, and Morton UCD® 1507 were found particularly useful (0.5–1.0 weight %). Carbon black pigments such as Raven 1020 and 1035 (surface oxidized) can be obtained form Columbian Chemicals Company (Marietta, Ga., U.S.A.). Elftex® 8 can be obtained from Cabot Corporation (Billerica, Mass., U.S.A.). Carbon black dispersion UCD 1507® was obtained Morton International, Inc. (Lansing, Ill., U.S.A.).

The coating compositions and systems of the present invention preferably include a defoamer or anti-foam agent. Particularly, the compounds available by the trade names BYK™ 024, BYK™ 022, Surfynol DF-75, Surfynol DF-210, and Foamaster™ VF were found useful in the present invention in the amount of about 0.2 to about 2.5 weight percent.

Foam control additives such as Surfynol DF-210 and Surfynol DF-75 are obtained from Air Products and Chemicals, Inc. (Allentown, Pa., U.S.A.). Silicons defoamers based on hydrophobic polysiloxanes for aqueous systems such as BYK™ 024, BYK™ 026, and BYK™ 022 were obtained from BYK-Chemie USA (Wallingford, Conn., U.S.A.). Antifoamer such as Foamaster™ VF was obtained from Henkel Corporation (Ambler, Pa., U.S.A.).

The foregoing description and the following examples are offered primarily for illustration and not as limitations. It will be readily apparent to those ordinary skill in the art that the operating conditions, materials, procedural steps and other parameters of the compositions described herein may be further modified or substituted in various ways without departing from the spirit and scope of the invention. The invention is not limited to what is described but also includes undescribed equivalents of the invention recited in the claims.

EXAMPLES

The following examples are provided by way of representation and not limitation.

Example 1

The general composition of the present one-pack waterborne adhesion primer with direct adhesion to plastic substrate, in particular to thermoplastic olefins is shown below.

| INGREDIENTS | Wt % |
|---|---|
| Pigment Grind: | |
| Polyurethane dispersion blends | 10–40% |
| Anionic aqueous polyurethane dispersion | 5–30% |
| Wetting and dispersing additive | 0.1–1% |
| Defoamer 1 | 0.1–0.4% |
| Flowability control | 0.2–1% |
| Pigment | 0.1–1% |
| Filler 1 | 1–10% |
| Filler 2 | 5–20% |
| Disperse at high speed to 6+ Hegman. Add the following in order to the grind portion under agitation and mix until uniform: | |
| Letdown: | |
| Polyurethane dispersion blends | 5–15% |
| Adhesion promoter | 10–40% |
| Defoamer 2 | 0.1–0.4% |
| Coalescing agent 1 | 1–10% |
| Coalescing agent 2 | 0.1–1% |
| Substrate wetting additive 1 | 0.5–2% |
| Substrate wetting additive 2 | 0.1–1% |
| Preservative | 0.1–0.5% |

The content of each ingredient will vary depending on the performance requirements of the final product, e.g. gloss, VOC, dry film thickness, viscosity.

Example 2

Preparation of a low gloss, fast dry formulation of the one-pack waterborne adhesive primer.

| INGREDIENTS | Wt % |
|---|---|
| Pigment Grind: | |
| UCX99-027 | 24.5 |
| Witcobond ® W-240 | 7.1 |
| Surfynol 131 | 0.5 |
| Surfynol DF-75 | 0.2 |
| Cab-O-Sil ® –5 | 0.6 |
| Raven 1035 | 0.5 |
| Wollastocoat ® 10 ES | 5.1 |
| VANTALC ® 6H | 14.2 |
| Disperse at high speed to 6+ Hegman. Add the following in order to the grind portion under agitation and mix until uniform: | |
| Letdown: | |
| UCX99-027 | 10.0 |
| CP347W | 30.5 |
| BYK ®-024 | 0.2 |
| ARCOSOLV ® DPNB | 4.2 |
| NMP | 0.8 |
| BYK ® 348 | 0.5 |
| Surfynol 104 DPM | 1.0 |
| Nuosept ® 95 | 0.2 |

PHYSICAL DATA

Total weight solids, %: 43
Total volume solids, %: 35
Pounds/Gallon: 9.85
Volatile organic compounds (VOCs): 2.1
Viscosity, Brookfield model DV-II + viscometer (ASTM D 2196):
3 spindle at 60 RPM, cps: 156 at 20.8° C.
pH (ASTM D 4584): 9.2 at 19.2° C.
Typical film properties:
Dry film thickness: 2.0 mil
Substrate: TPO or PP panel
Bake schedule at 160° F., minutes: 20
Pencil Hardness: 6H
MEK resistance, double rub: 40
Gloss at 60°: 5

GENERAL TEST PROCEDURES:

Spray two coats of the one-pack waterborne adhesive onto the plastic substrate (panels composed of TPO or PP) using a high volume low pressure gun (about 20 psig). The coating should have a film thickness of about 1.5–2.0 mil. Bake the coated panel at 160° F. for 20 minutes, or alternatively, cure the coated panel under ambient conditions for 7 days.

Evaluate the baked panel according to the ASTM D 3359 crosshatch adhesion tape test, the ASTM D 4541 adhesion test, the ASTM D3363 scratch resistance test, and the ASTM D 4752 solvent resistance test. Evaluate the baked panel according to the ASTM D 523 test using a BYK-Gardner micro-TRI-gloss instrument. Evaluate the baked panel for compatibility and recoatability with commercial basecoat and clearcoat.

Example 3

A Low CPO concentration formulation.

| INGREDIENTS | Wt % |
|---|---|
| Pigment Grind: | |
| UCX99-027 | 46.7 |
| Surfynol 131 | 0.9 |
| Surfynol DF-75 | 0.3 |
| Cab-O-Sil ® M-5 | 0.6 |
| Raven 1020 | 0.7 |
| Wollastocoat ® 10 ES | 6.1 |
| VANTALC ® 6H | 14.1 |
| Disperse at highspeed to 6+ Hegman. Add the following | |

-continued

| | |
|---|---|
| in order to the grind portion under agitation and mix until uniform: | |
| Letdown: | |
| CP347W | 25.6 |
| ARCOSOLV ® DPM | 1.0 |
| NMP | 0.6 |
| BYK ® 348 | 0.5 |
| Surfynol 104 DPM | 1.0 |
| Nuosept ® 95 | 0.2 |

PHYSICAL DATA

Gloss (60°): 6.0
Dry and Wet Tape (7 days) Adhesion: 5B
Viscosity (Ford cup #4): 25 seconds
pH: 9.2
Dry Film Thickness: 2.1 mil

Example 4

Low gloss one-pack waterborne adhesion primer formulation.

| INGREDIENTS | Wt % |
|---|---|
| Pigment Grind: | |
| UCX99-027 | 34.6 |
| Solsperse 27000 | 0.8 |
| Foamaster VF | 0.5 |
| Cab-O-Sil ® M-5 | 0.7 |
| Raven 1020 | 0.7 |
| Wollastocoat ® 10 ES | 5.0 |
| VANTALC ® 6H | 16.4 |
| Disperse at high speed to 6+ Hegman. Add the following in order to the grind portion under agitation and mix until uniform: | |
| Letdown: | |
| CP347W | 38.5 |
| ARCOSOLV ® DPM | 1.6 |
| NMP | 0.4 |
| BYK ® 348 | 0.5 |
| Nuosept ® 95 | 0.2 |

PHYSICAL DATA

Gloss (60°): 4
Dry and Wet Tape Adhesion (7 days): 5B

Example 5

High gloss waterborne adhesion primer formulation.

| INGREDIENTS | Wt % |
|---|---|
| Pigment Grind: | |
| UCX99-027 | 33.5 |
| Witcobond ® W-240 | 11.2 |
| Surfynol 131 | 0.6 |
| Surfynol DF-75 | 0.3 |
| Cab-O-Sil ® –5 | 0.4 |
| Raven 1020 | 0.9 |
| Wollastocoat ® 10 ES | 2.7 |
| VANTALC ® 6H | 7.8 |

-continued

| | |
|---|---|
| Disperse at high speed to 6+ Hegman. Add the following in order to the grind portion under agitation and mix until uniform: | |
| Letdown: | |
| CP347W | 37.3 |
| ARCOSOLV ® DPNB | 3.3 |
| NMP | 0.7 |
| BYK ® 348 | 0.6 |
| Surfynol 104 DPM | 0.3 |
| Nuosept ® 95 | 0.1 |

PHYSICAL DATA

Gloss (60°): 19
Dry and Wet Tape Adhesion (7 days): 5B

Example 6

High gloss waterborne adhesion primer formulation.

| INGREDIENTS | Wt % |
|---|---|
| Pigment Grind: | |
| UCX00-002 | 35 |
| Witcobond ® W-240 | 13 |
| Surfynol 131 | 0.7 |
| Surfynol DF-75 | 0.3 |
| Cab-O-Sil ® M-5 | 0.4 |
| Raven 1020 | 0.7 |
| Wollastocoat ® 10 ES | 2.6 |
| VANTALC ® 6H | 8.6 |
| Disperse at high speed to 6+ Hegman. Add the following in order to the grind portion under agitation and mix until uniform: | |
| Letdown: | |
| CP347W | 33.5 |
| Surfynol DF-75 | 0.2 |
| ARCOSOLV ® DPNB | 3.2 |
| NMP | 0.7 |
| BYK ® 348 | 0.5 |
| Surfynol 104 DPM | 0.4 |
| Nuosept ® 95 | 0.3 |

PHYSICAL DATA

Gloss (60°): 20
Dry and Wet Tap (7 days): 5B

Example 7

High Gloss and low CPO, One-Pack Waterborne Adhesion Primer Formulation.

| INGREDIENTS | Wt % |
|---|---|
| Pigment Grind: | |
| UCX99-027 | 18.3 |
| Witcobond ® W-240 | 14.8 |
| Surfynol 131 | 0.8 |
| Surfynol DF-75 | 0.1 |
| R972 | 0.3 |
| Raven 1020 | 0.8 |
| Wollastocoat ® 10 ES | 1.4 |
| VANTALC ® GH | 5.5 |

-continued

| INGREDIENTS | Wt % |
|---|---|
| Letdown: | |
| UCX99-027 | 20 |
| CP347W | 14.8 |
| BYK ®-024 | 0.2 |
| ARCOSOLV ® DPNB | 3.0 |
| NMP | 1.1 |
| BYK ® 348 | 0.5 |
| Surfynol 104 DPM | 0.8 |
| Nuosept ® 95 | 0.2 |
| PHYSICAL DATA | |

Dry film thickness: 1.7 mil

Bake temperature: 160° F. at 15 min

Solvent resistance (MEK): pass (no wrinkle)

Water resistance (>20 days): 5B (no peeling)

Solvent rub test (MEK): >32

Sanding test (#400 sand): >20

Gloss (60): 42

Adhesion test by bending the panel: no peeling or change of appearance observation Wet adhesion (>20 days): 5B Dry adhesion: 5B VOC: 1.75 lb/gal Viscosity: 18 sec (Ford cup #4)

pH: 9.2

WT % Solid: 35.5

Volume % solids: 31.8

Compatible test with ICI, PPG and Sherwin Williams base-coats: Excellent adhesion Particle size distribution: mean diameter 87.3 nm (Accusizer Optical Particle Sizer Model 770, Submicron Particle Sizer Autodilite Model 370)

HVLP gun: pressure 20 psig

Coating: Dry 2 coat (dry coat and wet coat)

Substrate: TPO

TABLE I

Characteristic Viscosity Profile of One-Pack Waterborne Adhesion Primer
Brookfield Model DV-II + Viscometer
30 RPM, S63, Spindle #3

| Degree C | CP (mPa.S) |
|---|---|
| 1.9 | 512 |
| 10.5 | 480 |
| 17.4 | 388 |
| 28.6 | 316 |
| 37.0 | 256 |
| 47.5 | 244 |

Example 8

Ultra Low VOC One-Pack Waterborne Adhesion Primer Formulation.

| INGREDIENTS | Wt % |
|---|---|
| Pigment Grind: | |
| UCX99-027 | 18.5 |
| Surfynol 131 | 0.9 |
| Surfynol DF-75 | 0.1 |
| M5 | 0.8 |
| Raven 1020 | 0.6 |
| Wollastocoat ® 10 ES | 6.1 |
| VANTALC ® GH | 18.2 |
| Letdown: | |
| UCX99-027 | 20 |
| CP347W | 34.4 |
| BYK ®-024 | 0.2 |
| ARCOSOLV ® DPNB | 1.0 |
| NMP | 0.5 |
| BYK ® 348 | 0.5 |
| Surfynol 104 DPM | 0.9 |
| Nuosept ® 95 | 0.2 |
| PHYSICAL DATA | |

Density: 10.20 lb/gal
WT % solid: 47.32
WT % volume: 37.43
VOC: 0.4 lb/gal
Dry and wet adhesion: 5B
Gloss (60°): 4.6

Example 9

Ultra Low VOC One-Pack Waterborne Adhesion Primer Formulation.

| INGREDIENTS | Wt % |
|---|---|
| Pigment Grind: | |
| UCX99-027 | 18.5 |
| Surfynol 131 | 0.9 |
| Surfynol DF-75 | 0.1 |
| M5 | 0.8 |
| Raven 1020 | 0.6 |
| Wollastocoat ® 10 ES | 6.1 |
| VANTALC ® 6H | 18.2 |
| Letdown: | |
| UCX99-027 | 20 |
| CP347W | 34.4 |
| BYK ®-024 | 0.2 |
| ARCOSOLV ® DPNB | 1.0 |
| NMP | 0.5 |
| BYK ® 348 | 0.5 |
| Surfynol 104 DPM | 0.9 |
| Nuosept ® 95 | 0.2 |
| PHYSICAL DATA | |

Density: 10.20 lb/gal
WT % solid: 47.32
WT % volume: 37.43
VOC: 0.4 lb/gal
Dry and wet adhesion: 5B
Gloss (60°): 4.6

Example 10
One-Pack Waterborne Adhesion Primer Formulation

| INGREDIENTS | Wt % |
|---|---|
| Pigment Grind: | |
| UCX99-027 | 15.0 |
| Solsperse 27000 | 0.8 |
| Foamaster VF | 0.51 |
| Cab-O-Sil M5 | 0.73 |
| Raven 1020 | 0.65 |
| Wollastocoat ® 10 ES | 5.02 |
| VANTALC ® 6H | 16.44 |
| Letdown: | |
| UCX99-027 | 19.59 |
| CP347W | 38.49 |
| ARCOSOLV ® DMP | 1.59 |
| NMP | 0.51 |
| BYK ® 348 | 0.43 |
| Nuosept ® 95 | 0.24 |
| PHYSICAL DATA | |
| Dry and wet adhesion: 5B | |
| Gloss (60°): 4.6 | |

ADHESION TEST METHODS

Adhesion is measured according to the ASTM D 3359 Standard Test Methods for Measuring Adhesion by Tape test and the ASTM 4541 Method for Pull-off Strength of Coating Using Portable Adhesion-Testers. The pneumatic adhesion tester used an Elcometer 110 PATTI®.

The combination plastic substrate and waterborne primer was subjected to the above battery of tests. The combination showed no adhesion lose (see Table I). The force induced by bend at the plastic substrate/primer interface did not exceed the adhesive energy between the two layers.

TABLE II

One-Pack Waterborne Adhesion Primer/surfacers Adhesion Test Results:

| Test Methods | Peel Adhesion Testing on TPO Substrate Results |
|---|---|
| ASTM D 3359 | 5B, 0% paint removed (Initial Adhesion) |
| ASTM D 3359 | 5B, 0% paint removed (Adhesion after humidity)<br>No blisters |
| ASTM D 3359 | 5B, 0% paint removed (Adhesion after fuel soak)<br>No lifting or blisters |
| ASTM D 4541 | 450 psi |

Solvent Rub Resistance and Water Resistance

The MEK solvent resistance of the waterborne primer was evaluated using ASTMD 4752, Test Method for Measuring MEK Resistance of Ethyl Silicate (Inorganic) Zinc-Rich Primers by Solvent Rub. The test is performed by 1) soaking a gauze cloth in a MEK solvent and 2) using the thumb to rub back and forth (two strokes). The test results showed that the MEK resistance double rub about 40 times. The plastic coatings showed no blister, dull, wrinkle, or peel when subjected to controlled condensation according to ASTMD 4585 Practice for Testing the Water resistance of Coatings Using Controlled Condensation Method and X-scribed.

VOC Content

The EPA enacted rule restricting the VOC content of coating formulations supplied to the automotive refinish industry. The new VOC content limits are listed in Table IV. The compliance date was Jan. 11, 1999.

TABLE III

VOC Content Standards for Automotive Refinish Coatings

| Coating Category | VOC Standard | The Present Compositions |
|---|---|---|
| Primer/Primer surfacer | 4.8 lbs/gal | 0.4–2.0 lbs/gal |

Basecoat and Clearcoat Appearance

The combination of TPO or PP plastic panel and waterborne primer coat and commercial basecoat and clearcoat had flexibility and a high gloss (60°:10–40). The combination was smooth, uniform, free of sags, pinholes, seediness, and had very little orange peel. The back of the coating had no pell. These results indicate that the present one-coat waterborne primer has compatibility with commercial basecoats and clearcoats.

The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A one-pack adhesion coating characterized by a VOC content of about 0.4 to about 2.0 lbs/gal consisting essentially of:
   (a) a resin selected from halogenated polyolefinic resin materials, halogenated vinyl resins, epihydrin resins, halogenated epoxy resins, and mixtures thereof, wherein the amount of resin is in the range of 5 to 40 weight percent;
   (b) a modified anionic polyurethane dispersion blend wherein the amount of dispersion blend is in the range of 30 to 50 weight percent;
   (c) a coalescing agent consisting essentially of a combination of water insoluble glycol ethers and NMP in an amount of 2 to 10 weight percent;
   (d) an anionic surfactant wherein the amount of surfactant is in the range of 0.3 to 2.0 weight percent;
   (e) a wetting and dispersing additive in an amount of 0.1 to 0.5 weight percent.

2. The improved adhesion coating of claim 1, wherein said resin is chlorinated polyolefin resin.

3. The improved adhesion coating of claim 1, wherein said water insoluble glycol ethers are selected from the group consisting of DPNB, DPM, PNB and NMP.

4. The improved adhesion coating of claim 1, wherein said anionic surfactant is a polyether modified dimethylpolysiloxane.

5. The improved adhesion coating of claim 1, wherein said adhesion coating further comprises a preservative.

6. The improved adhesion coating of claim 1, wherein said adhesion coating further comprises carbon black.

7. The improved adhesion coating of claim 1, wherein the modified anionic polyurethane dispersion blend is selected from the group CK Witco series UCX99 (research code) and UCX00 (research code) modified anionic polyurethane dispersion blends, and CK Witco Witcobond™ W-240.

8. The improved adhesion coating of claim 1, wherein Surfynol™ DF-75 and Surfynol™ 104DPM are added for foam control.

9. A method of making a one-pack adhesion coating, said method comprising the steps of:
(a) forming an admixture that is substantially free of aromatic organic solvents, and includes effective film-forming amounts of:
 (i) coalescing agents;
 (ii) an anionic surfactant;
 (iii) a polyolefinic resin material;
(b) baking said admixture to a curing temperature of about 150° F.–160° F. for about fifteen to about twenty minutes; and,
(c) adding NMP and coalescing agent to the heated admixture to form a resulting admixture that is substantially free of aromatic organic solvents.

10. A method according to claim 9, wherein the coating composition further includes a mixture comprising a modified anionic polyurethane blend.

11. A method according to claim 9, wherein the polyolefinic resin material is based on a chlorinated polyolefin resin.

12. A method of making a one-pack adhesion coating, said method comprising the steps of:
(a) forming an admixture that is substantially free of aromatic organic solvents, and that includes effective film-forming amounts of:
 (i) coalescing agents;
 (ii) an anionic surfactant;
 (iii) a polyolefinic resin material; and,
(b) curing said admixture under ambient temperature conditions for about seven days.

13. A method according to claim 12, wherein the coating composition further includes a mixture comprising a modified anionic polyurethane blend.

14. The improved adhesion coating of claim 12, wherein the modified anionic polyurethane dispersion blend is selected from the group CK Witco series UCX99 (research code) and UCX00 (research code) modified anionic polyurethane dispersion blends, and CK Witco Witcobond™ W-240.

15. A method according to claim 12, wherein the polyolefinic resin material is based on a chlorinated polyolefin resin.

* * * * *